C. H. ANDERSON.
CAR BOLSTER.
APPLICATION FILED AUG. 18, 1910.
978,424.
Patented Dec. 13, 1910.
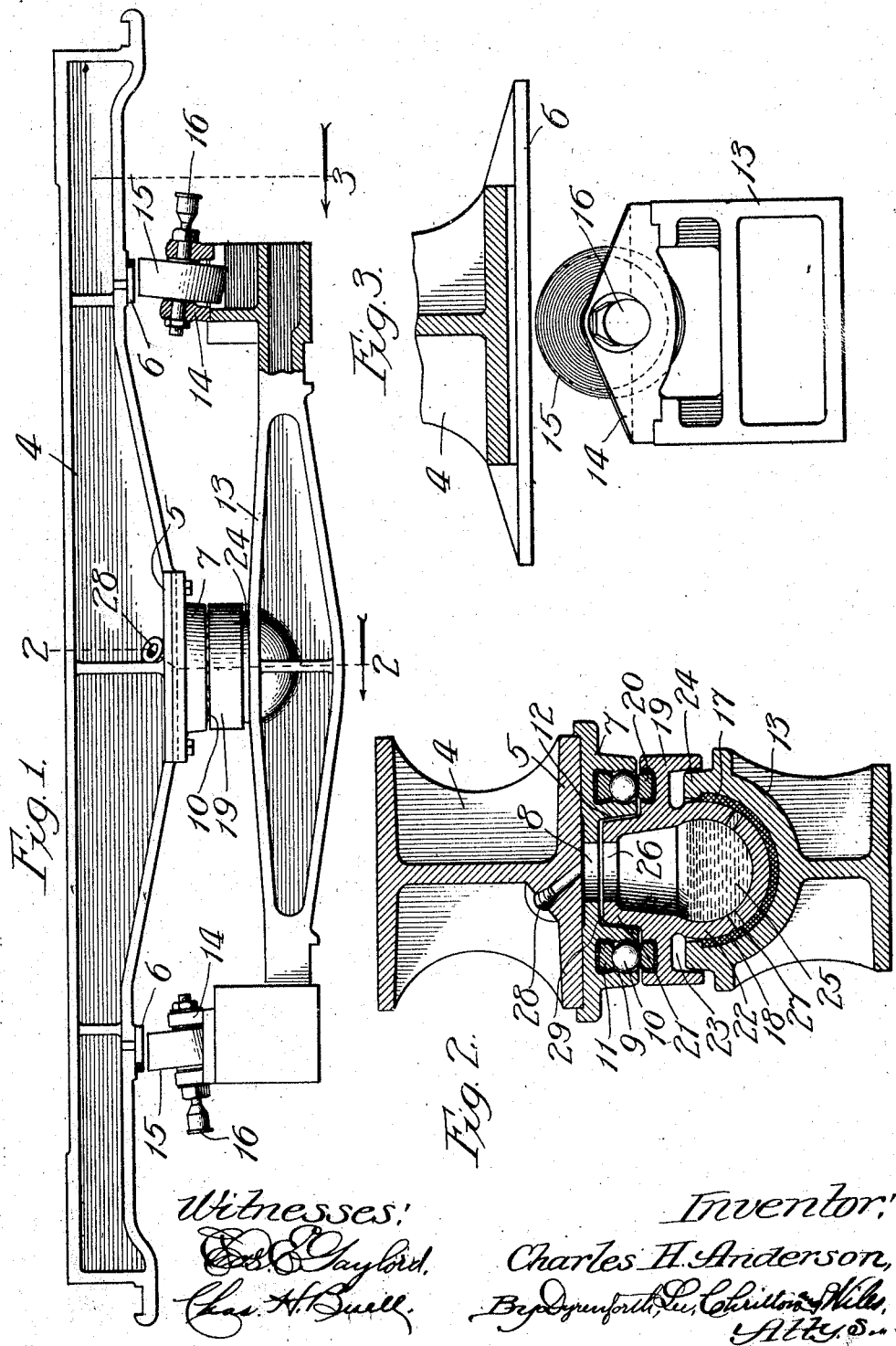

UNITED STATES PATENT OFFICE.

CHARLES H. ANDERSON, OF SEATTLE, WASHINGTON.

CAR-BOLSTER.

978,424.

Specification of Letters Patent. Patented Dec. 13, 1910.

Application filed August 18, 1910. Serial No. 577,776.

*To all whom it may concern:*

Be it known that I, CHARLES H. ANDERSON, a citizen of the United States, residing at Seattle, in the county of King and State of Washington, have invented a new and useful Improvement in Car-Bolsters, of which the following is a specification.

My invention relates to improvement in ball and socket counter-bearing connections for the body and truck bolsters of a railway-car, and is in the nature of an improvement upon the construction shown and described in Letters Patent No. 941,691, granted to me November 30, 1909, for car-bolsters.

A ball and socket center-bearing for the companion bolsters has advantages over other types of center bearings particularly when the car encounters short curves in, or changes in inclination of, the track; and my present object is to provide certain improvements upon the aforesaid patented construction with a view to avoiding material friction and wear at the ball and socket, and in other ways to better adapt the center-bearing for contribution to the safety and smoothness of travel of the car-body.

In the drawing—Figure 1 is a side elevation, partly in section, of a pair of companion body and truck bolsters provided with my improvements; Fig. 2, is an enlarged section taken on irregular line 2—2 in Fig. 1; and Fig. 3, an enlarged broken section on line 3 in Fig. 1.

The numeral 4 designates a steel car-body bolster provided with a flat center-plate portion 5 and laterally-projecting bearing plates 6. Fitting against and secured to the part 5 is a bearing-plate 7 having a central opening 8 and an annular socket 9 for a ball-race 10. In the base of the socket 9 is a ball-race wearing-ring 11. The plate 7 is formed with a central socket 12.

The numeral 13 designates a steel truck-bolster provided at opposite ends with bearings 14 for rollers 15 registering with the under surfaces of the bearing plates 6. The journals of the rollers 15 are fitted with grease-cups 16 or other suitable lubricators. At the center of the bolster 13 is a semi-spherical recess 17 fitted with a Babbitt, or similar, lining 18 and forming a socket. Interposed between the truck-bolster and bearing-plate 7 is a hollow bearing-piece 19 fitted with a ring 20, forming the lower ball-race bearing-ring, and having a central tapering boss-portion 21 fitting loosely into the socket 12. The bearing-piece 19 is also formed with a semi-spherical head 22, fitting the socket 17 of the truck-bolster, and a groove 23 fitting loosely over an annular tongue 24 surrounding said socket. The semi-spherical head 22 and babbitted recess 17 form a ball and socket joint, from which the surrounding tongue and groove connection tends to exclude dust. The hollow bearing-piece 19 has a chamber 25 with an opening 26 at its top registering with the opening 8. In the ball-member 22 of the bearing are outlet-openings 27 for lubricating oil contained in the chamber 25. The lubricant is charged into the chamber through a feed-tube 28, which is on the car-body bolster and registers with the opening, or passage 8.

In practice, the car-body bolster 4 may turn without material friction on the ball-bearing 10, and it and the bearing-piece 19 may rock within reasonable limits on the ball and socket connection, which is kept well lubricated by the oil from the chamber 25. The rocking of the car-body bolster in the direction of its length is limited by contact of its plates 6 with the rollers 15. Between the parts 7 and 19 there is a space or channel 29 through which oil, splashing from the chamber 25, will pass to the ball-bearing.

While I prefer to construct my improvements as shown and described, they may be variously modified in the matter of details of construction without departing from the spirit of my invention as defined by the claims.

What I claim as new and desire to secure by Letters Patent is—

1. In combination, a car-body bolster, a truck-bolster and a ball and socket bearing-connection for the bolsters, the ball-member forming a lubricant-reservoir provided with an outlet leading to the socket-member, for the purpose set forth.

2. In combination, a car-body bolster, a truck-bolster and a ball and socket bearing-connection for the bolsters, the ball-bearing member forming a lubricant-reservoir provided with an outlet leading to the socket-member, and the car-body bolster having a lubricant charging-passage communicating with this reservoir, for the purpose set forth.

3. In combination, a car-body bolster, a center-bearing plate secured to the under side thereof, a truck-bolster having a socket-member, a bearing-piece, interposed between the bolsters, having a ball-member engaging said socket-member and forming therewith a ball and socket connection between the bearing-piece and truck-bolster, and an annular ball-bearing between said bearing-piece and center-bearing plate.

4. In combination, a car-body bolster, a center-bearing plate secured thereto and having a central socket in its under side, a truck-bolster having a socket-member, a bearing-piece, interposed between the bolsters, having a central boss on its upper side loosely entering said central socket in the center-bearing plate, and a ball-member engaging said socket-member, and an annular ball-bearing between said center-bearing plate and bearing-piece, said bearing-piece being hollow and perforated to form a lubricant reservoir and supplier for the ball and socket connection.

5. In combination, a car-body bolster, a center-bearing plate secured thereto and having a central socket in its under side, a truck-bolster having a socket-member, a bearing-piece, interposed between the bolsters, having a central boss on its upper side loosely entering said central socket in the center-bearing plate, and a ball-member engaging said socket-member, an annular ball-bearing between said center-bearing plate and bearing-piece, and an annular tongue and groove connection between said bearing-piece and truck-bolster about said socket-member, said bearing-piece being hollow and perforated and forming a lubricant reservoir and supplier for the ball and socket connection.

CHARLES H. ANDERSON.

In the presence of—
  Morris B. Sachs,
  R. E. Banks.